United States Patent
Kim

(10) Patent No.: US 7,965,236 B2
(45) Date of Patent: Jun. 21, 2011

(54) APPARATUS AND METHOD FOR MEASURING MOVING DISTANCE IN MOBILE COMMUNICATION SYSTEM

(75) Inventor: Ki-Soo Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 213 days.

(21) Appl. No.: 11/803,802

(22) Filed: May 16, 2007

(65) Prior Publication Data

US 2008/0012766 A1    Jan. 17, 2008

(30) Foreign Application Priority Data

Jul. 12, 2006    (KR) ........................ 10-2006-0065222

(51) Int. Cl.
     *G01S 3/02*      (2006.01)
(52) U.S. Cl. ...................................... 342/461
(58) Field of Classification Search .................. 342/451, 342/461; 455/441
See application file for complete search history.

(56) References Cited

U.S. PATENT DOCUMENTS

| 5,055,849 | A | * | 10/1991 | Andersson et al. | ........... 342/104 |
| 5,317,315 | A | * | 5/1994 | Karhunen et al. | ........... 342/26 B |
| 5,532,697 | A | * | 7/1996 | Hidaka et al. | .................. 342/104 |
| 6,009,375 | A | * | 12/1999 | Sakumoto et al. | ............. 701/216 |
| 6,029,496 | A | * | 2/2000 | Kreft | .............................. 73/1.37 |
| 6,285,314 | B1 | * | 9/2001 | Nagatsuma et al. | ...... 342/357.08 |
| 6,388,613 | B1 | * | 5/2002 | Nagatsuma et al. | ...... 342/357.08 |
| 6,542,745 | B1 | * | 4/2003 | Mottier et al. | ................. 455/441 |
| 7,336,223 | B2 | * | 2/2008 | Franckart et al. | ......... 342/357.05 |

FOREIGN PATENT DOCUMENTS

KR    10-2004-0067081      7/2004
KR    10-2005-0099635      10/2005

OTHER PUBLICATIONS

Bo et al, "Vehicular Node Positioning Based on Doppler-Shifted Frequency Measurement on Highway," Journal of Electronics (China), vol. 26, No. 2, Mar. 2009, pp. 265-269.*

* cited by examiner

Primary Examiner — Gregory C Issing
(74) Attorney, Agent, or Firm — The Farrell Law Firm, P.C.

(57) ABSTRACT

An apparatus and a method for measuring a moving distance in a mobile communication terminal. A Doppler frequency over a time interval for measuring a moving speed of the Doppler frequency is measured or calculated. The moving speed is calculated. The moving distance is calculated using the moving speed and the time interval.

6 Claims, 4 Drawing Sheets

APPARATUS AND METHOD FOR MEASURING MOVING DISTANCE IN MOBILE COMMUNICATION SYSTEM

PRIORITY

This application claims priority under 35 U.S.C. §119 to an application filed in the Korean Intellectual Property Office on Jul. 12, 2006 and allocated Serial No. 2006-65222, the contents of which are incorporated herein by reference.

BACKGROUND OF THE INVENTION

1. Field of the Invention

The present invention relates generally to an apparatus and method for measuring moving distances in a mobile communication terminal, and more particularly, to an apparatus and method for measuring moving distances in a mobile communication terminal using a Doppler frequency.

2. Description of the Related Art

Because mobile communication terminals are easy to carry, and include address books, schedulers, MPEG Layer-3 (MP3), digital cameras, and various other functions, they have become indispensable articles for modern living.

Thus, most people today carry their mobile communication terminals on their person everywhere they go. However, when a mobile communication terminal user wishes to calculate a distance that a user travels, the user must carry a separate device capable of measuring distances, as there is currently no such function built into mobile communication terminals.

SUMMARY OF THE INVENTION

The present invention substantially solves at least the above problems and/or disadvantages and provides at least the advantages below. Accordingly, an aspect of the present invention is to provide an apparatus and method for measuring moving distances in a mobile communication terminal.

Another aspect of the present invention is to provide an apparatus and method for measuring moving distances using a Doppler frequency in a mobile communication terminal.

A further aspect of the present invention is to provide an apparatus and method for accurately measuring moving distances by calculating a Doppler frequency of a frame in which the Doppler frequency has not been measured in a mobile communication terminal.

A still further aspect of the present invention is to provide an apparatus and method for calculating a Doppler frequency of a frame in which the Doppler frequency has not been measured in a mobile communication terminal, using interpolation.

According to an aspect of the present invention, there is provided an apparatus for measuring a moving distance in a mobile communication terminal, the apparatus including a Doppler frequency checker for measuring or calculating a Doppler frequency over a time interval for measuring a moving speed of the Doppler frequency; a speed calculator for calculating the moving speed; and a distance calculator for calculating a moving distance using the moving speed and the time interval.

According to another aspect of the present invention, there is provided a method of measuring a moving distance in a mobile communication terminal, the method including measuring or calculating a Doppler frequency over a time interval for measuring a moving speed of the Doppler frequency; calculating the moving speed; and calculating the moving distance using the moving speed and the time interval.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Below is a description of how to calculate a distance moved using a Doppler frequency in a mobile communication terminal, according to the present invention.

Figure 1:
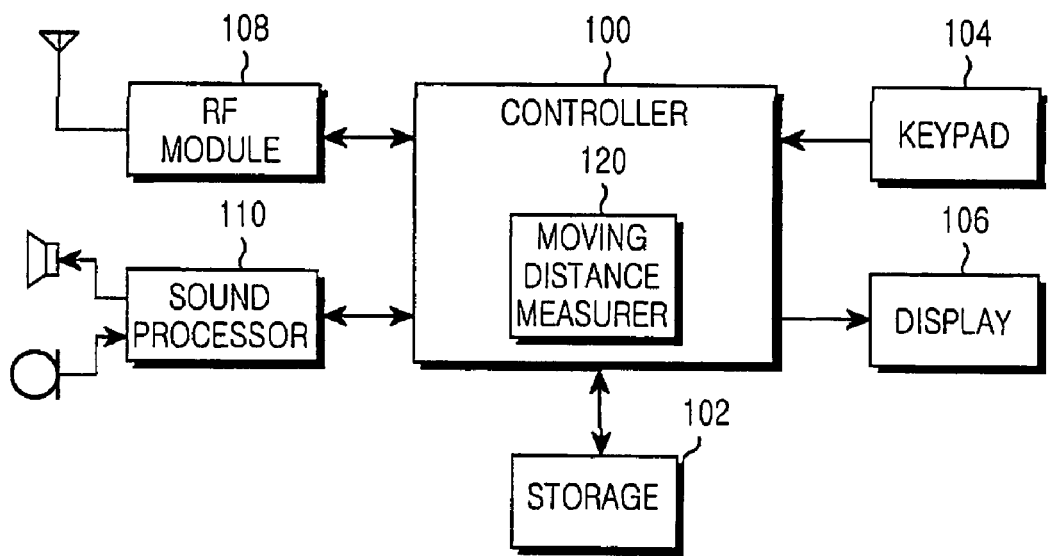
FIG. 1 is a block diagram of a mobile communication terminal according to the present invention.

FIG. 1 shows a mobile communication terminal according to the present invention. The mobile communication terminal described below may be a cellular phone, a Personal Communication System (PCS), a Personal Digital Assistant (PDA), an International Mobile Telecommunication-2000 (IMT2000) device, etc., and will include the basic configuration of the above devices.

Referring to FIG. 1, a controller 100 controls the overall operation of the terminal. For example, it performs the controlling for audio communication and data communication processing. And, the controller 100 includes the moving distance measurer 120 and controls the measuring of a moving distance of the terminal using a Doppler frequency.

The moving distance measurer 120 first measures a Doppler frequency, and then calculates the speed of the Doppler frequency to calculate the moving distance of the terminal, as will be described below with reference to FIG. 2.

The storage 102 stores programs for performing the overall operation of the terminal, temporary data generated from the operation of the terminal, system parameters, and other storable data including phone numbers and Short Message Service (SMS) messages, etc. And, the storage 102 stores measured values of a Doppler frequency measured at regular intervals.

The keypad 104 includes a 3×4 grid of number keys and a plurality of function keys (send, cursor, ok, etc.), and data corresponding to a key pressed by a user is supplied to the controller 100.

The display 106 displays data on the current operation of the terminal, characters a user inputs, and moving and still pictures. In the present invention, the display 106 displays a moving distance measured by the moving distance measurer 120.

The Radio Frequency (RF) module 108 processes RF frequencies sent and received through an antenna. The sound processor 110 processes input/output audio signals used for audio communications using a speaker and microphone connected to the sound processor 110.

Figure 2:
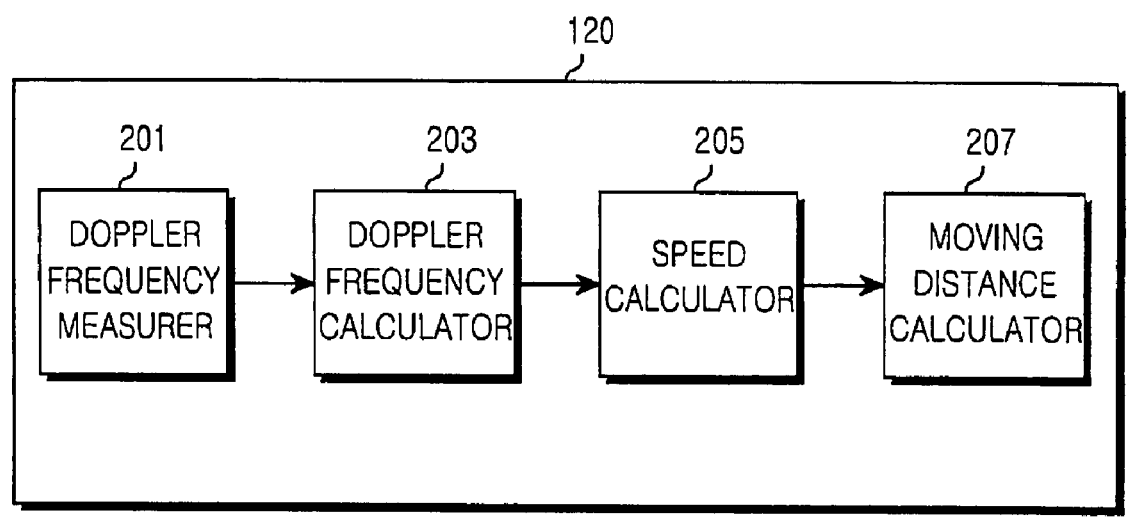
FIG. 2 is a detailed block diagram of a moving distance measurer according to the present invention.

FIG. 2 shows a moving distance measurer according to the present invention. The moving distance measurer 120 includes a Doppler frequency measurer 201, a Doppler frequency calculator 203, a speed calculator 205, and a moving distance calculator 207.

The Doppler frequency measurer 201 uses a signal received from a base station to measure a Doppler frequency. The Doppler frequency measurer 201 measures the Doppler frequencies for every frame (4.615 ms) the terminal is being used for communication (in TCH mode). Conversely, the Doppler frequency measurer 201 measures the Doppler frequency only when a Broadcast Control CHannel (BCCH) is received or a paging is requested during idle mode.

When the Doppler frequency measurer 201 is unable to measure the Doppler frequency of a frame included in a predetermined time interval in order to measure a moving speed, the Doppler frequency calculator 203 performs interpolation of Doppler frequencies measured by the Doppler frequency measurer 201 and calculates a Doppler frequency for the frame. That is, the longer the interval for measuring the Doppler frequency by the Doppler frequency measurer 201, the less accurate the moving distance is. Accordingly, in order to accurately measure a moving distance, the Doppler frequency calculator 203 uses the measured Doppler frequencies to calculate the Doppler frequency of the frame (for which a Doppler frequency has not been measured.)

Figure 4:
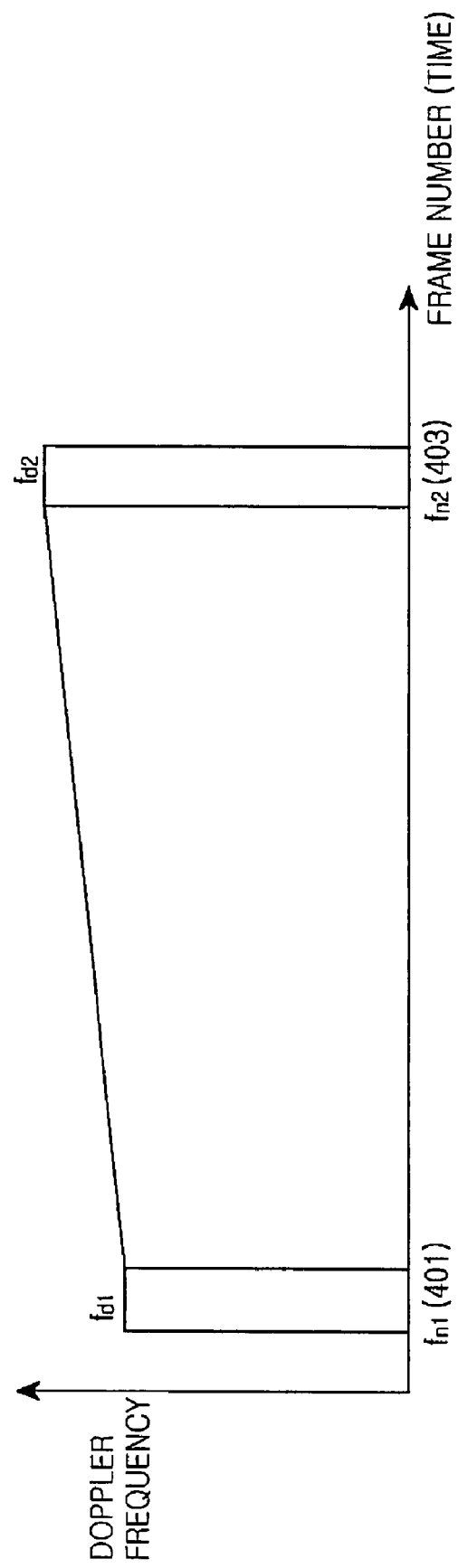
FIG. 4 is a graph showing the use of a measured Doppler frequency for supplementing purposes according to the present invention.

For example, as shown in FIG. 4, when the Doppler frequencies of frame $F_{n1}$ 401 and frame $F_{n2}$ 403 are measured by the Doppler frequency measurer 201, the Doppler frequency calculator 203 uses an interpolation, such as Equation (1) below, to calculate the Doppler frequencies of frames between frames $F_{n1}$ 401 and $F_{n2}$ 403.

$$f_d = \frac{f_{d2} - f_{d1}}{F_{n2} - F_{n1}} \times F_{nx} + f_{d1} \quad (1)$$

$F_{nx}$ is an arbitrary frame between frames $F_{n1}$ 401 and $F_{n2}$ 403, for which a Doppler frequency is to be calculated, and $f_d$ is the Doppler frequency of $F_{nx}$. Also, $f_{d1}$ is the Doppler frequency of $F_{n1}$ 401, and $f_{d2}$ is the Doppler frequency of $F_{n2}$ 403.

The speed calculator 205 uses the Doppler frequency measured by the Doppler frequency measurer 201 and the Doppler frequency calculated by the Doppler frequency calculator 203 to calculate the moving speed of each frame. The moving speed is calculated using Equation (2) below.

$$V_m = f_d \times C \div f_c \quad (2)$$

$V_m$ is the moving speed of each frame, and $f_d$ is the Doppler frequency of each frame. Also, C is the speed of light $3 \times 10^8$, and $f_c$ is the channel frequency.

In Table 1 below, Equation (2) is used to calculate the moving speed of Doppler frequencies. Here, the channel frequency is assumed as $9.25 \times 10^8$, which is the Global System for Mobile communication (GSM) frequency.

TABLE 1

| Speed (km/h) | Speed (m/s) | Light Speed (m/s) | Channel Frequency(Hz) | Doppler Frequency(Hz) |
| --- | --- | --- | --- | --- |
| 5.838 | 1.621621622 | 300000000 | 925000000 | 5 |
| 11.676 | 3.243243243 | 300000000 | 925000000 | 10 |
| 17.514 | 4.864864865 | 300000000 | 925000000 | 15 |

TABLE 1-continued

| Speed (km/h) | Speed (m/s) | Light Speed (m/s) | Channel Frequency(Hz) | Doppler Frequency(Hz) |
| --- | --- | --- | --- | --- |
| 23.351 | 6.486486486 | 300000000 | 925000000 | 20 |
| 29.189 | 8.108108108 | 300000000 | 925000000 | 25 |
| 35.027 | 9.72972973 | 300000000 | 925000000 | 30 |
| 40.865 | 11.35135135 | 300000000 | 925000000 | 35 |
| 46.703 | 12.97297297 | 300000000 | 925000000 | 40 |
| 52.541 | 14.59459459 | 300000000 | 925000000 | 45 |
| 58.378 | 16.21621622 | 300000000 | 925000000 | 50 |

As shown in Table 1, the speed calculator 205 calculates the moving speeds of the Doppler frequencies.

The moving distance calculator 207 uses the moving speed calculated by the speed calculator 205 and the time interval of the calculated moving speed to calculate the moving distance of the terminal. For example, when the Doppler frequency measurer 201 and the Doppler frequency calculator 203 measure and calculate the Doppler frequencies for each frame, the speed calculator 205 calculates the moving speeds of the Doppler frequencies in all the frames. Accordingly, the moving distance calculator 207 uses a frame interval of 4.615 ms and the moving speeds to calculate a total moving distance.

Figure 3:
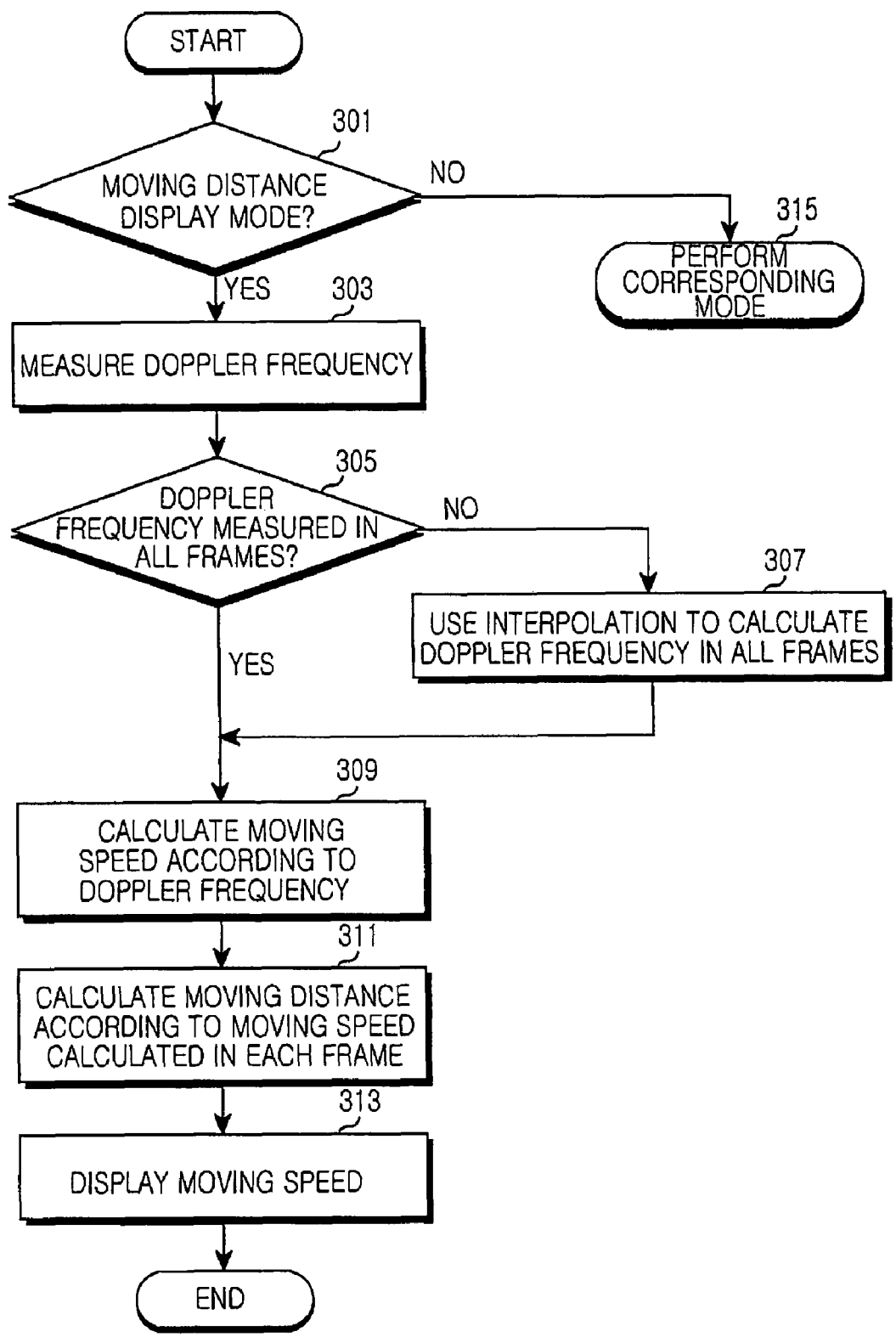
FIG. 3 is a flowchart of a process for measuring a moving distance according to the present invention.

FIG. 3 shows a process for measuring a moving distance according to the present invention. The description will be given of measuring a moving distance by measuring and calculating the Doppler frequencies of each frame, and setting the time interval used to calculate the moving speed as a frame unit. However, the time interval used to calculate the moving speed may be varied.

Referring to FIG. 3, the controller 100 determines in step 301 whether a moving distance display mode has been selected by a user's key input. If the moving distance display mode has not been selected, the controller 100 performs step 315, in which an appropriate mode (i.e., standby mode) is performed.

If the moving distance display mode has been selected, the controller 100 performs step 303, in which it uses signals received from a base station at preset intervals to measure Doppler frequency. For example, when a terminal is being used for communication, Doppler frequencies are measured for each frame. If the terminal is in standby mode, the Doppler frequencies are measured only when a broadcast control channel is received or a page request is made.

Next, the controller 100 performs step 305, in which it is determined whether the Doppler frequencies have been measured for each frame. If it is determined that the Doppler frequencies have been measured for each frame, the controller performs step 309, in which the measured Doppler frequencies are applied to Equation (2) to calculate the moving speed.

If it is determined that the Doppler frequency has not been measured for each frame, the controller 100 performs step 307, in which the measured Doppler frequencies are used to calculate the Doppler frequencies in frames between the measured frames using interpolation.

After the Doppler frequency is calculated for all the frames, the controller 100 performs step 309, in which the measured or calculated Doppler frequencies are applied to Equation (2) to calculate the moving speed.

After the moving speed for the measured or calculated Doppler frequencies is calculated, the controller 100 performs step 311, in which the calculated moving speed and the time intervals used to calculate the moving speed are used to calculate moving distance. For example, the time interval used to calculate the moving speed by measuring or calculating Doppler frequencies for each frame is a time interval of 4.615 ms for each frame.

After the moving distance is calculated, the controller 100 Performs step 313, in which displays the calculated moving distance in the display 106. Then the controller 100 ends the current process.

As described above, the Doppler frequencies that are not extracted from a mobile communication terminal are calculated to measure a moving distance, so the terminal can measure an accurate moving distance.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for measuring a moving distance in a mobile communication terminal, the apparatus comprising:
    a Doppler frequency measurer for measuring, if the terminal is in a standby mode, the Doppler frequencies for at least two frames, using a signal received from a base station when a broadcast control channel is received or a page request is made;
    a Doppler frequency calculator for calculating the Doppler frequency over a frame in which the Doppler frequency has not been measured, using an interpolation of the measured Doppler frequencies;
    a speed calculator for calculating the moving speed using the measured Doppler frequency and the calculated Doppler frequency; and
    a distance calculator for calculating a moving distance using the moving speed and a time interval.

2. The apparatus of claim 1, wherein the speed calculator calculates the moving speed using the measured Doppler frequency, the calculated Doppler frequency, a channel frequency, and a speed of light.

3. The apparatus of claim 1, further comprising a display for displaying the calculated moving speed.

4. A method of measuring a moving distance in a mobile communication terminal, the method comprising the steps of:
    measuring, if the terminal is in a standby mode, Doppler frequencies for at least two frames using a signal received from a base station when a broadcast control channel is received or a page request is made;
    calculating the Doppler frequency for a frame in which the Doppler frequency has not been measured, using an interpolation of the measured Doppler frequencies;
    calculating the moving speed using the measured Doppler frequency and the calculated Doppler frequency; and
    calculating the moving distance using the moving speed and a time interval.

5. The method of claim 4, wherein the step of calculating the moving speed uses the measured Doppler frequency, the calculated Doppler frequency, a channel frequency, and a speed of light.

6. The method of claim 4, further comprising displaying the calculated moving distance.

* * * * *